United States Patent Office 3,644,496
Patented Feb. 22, 1972

3,644,496
PRODUCTION OF ALKENYL ALKANOATES AND 3-HALOALKYL ALKANOATES
Paul R. Stapp, Bartlesville, Okla., assignor to Phillips Petroleum Company
No Drawing. Filed Dec. 31, 1969, Ser. No. 889,749
Int. Cl. C07c 67/00
U.S. Cl. 260—494
8 Claims

ABSTRACT OF THE DISCLOSURE

Alkenyl alkanoates and 3-haloalkyl alkanoates are produced by reacting a hydrogen halide, an alkene, paraformaldehyde and an alkanoic anhydride at a temperature in the range of −80 to −30° C.

---

This invention relates to an improved process for the production of alkenyl alkanoates and 3-haloalkyl alkanoates.

It is known in the art to produce alkenyl alkanoates from a 1-olefin, paraformaldehyde and acetic anhydride at a temperature above 200° C., see Chemical Abstracts, volume 65 (1966), columns 16847h and 16848d.

It now has been found that alkenyl alkanoates and 3-haloalkyl alkanoates are produced by reacting a hydrogen halide, an alkene, paraformaldehyde and an alkanoic anhydride at a temperature in the range of −80 to −30° C. As demonstrated by Examples I and II, the low temperatures are essential for good yields of both alkenyl alkanoates and 3-haloalkyl alkanoates.

Accordingly, it is an object of this invention to provide a process for the production of alkenyl alkanoates and 3-haloalkyl alkanoates.

Other objects, aspects and advantages of this invention will become apparent to one skilled in the art upon consideration of the following disclosure and appended claims.

The conversion of this invention can be represented as follows:

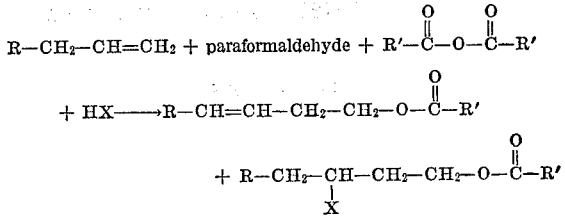

wherein R is hydrogen or alkyl, cycloalkyl or combinations thereof such as cycloalkylalkyl or alkylcycloalkyl having from 1 to 10 carbon atoms per R group, wherein R' is alkyl having from 1 to 6 carbon atoms per R' group and wherein X is a halogen such as chlorine, fluorine, bromine or iodine.

Specific examples of alkenes that can be employed in the process of this invention are propene, 1-hexene, 1-tridecene, 3-cyclopentylpropene, 3-cyclodecylpropene, 3-(2-methylcyclopentyl)propene, 3-(2-pentylcyclopentyl)-propene, 8-cyclopentyl-1-octene, 4-cyclononyl-1-butene, 4,5-dimethyl-1-octene, 6,6-diethyl-1-nonene, and the like, and mixtures thereof.

Specific examples of hydrogen halides that can be employed in the process of this invention are hydrogen iodide, hydrogen chloride, hydrogen fluoride and hydrogen bromide.

Specific examples of alkanoic anhydrides that can be employed in this invention are acetic anhydride, heptanoic anhydride, 2-methylhexanoic anhydride, 2,2-dimethylpentanoic anhydride, 2-ethyl-3-methylbutanoic anhydride, propanoic anhydride, butanoic anhydride, and the like, and mixtures thereof.

Specific examples of alkenyl alkanoates that are produced by the process of this invention are 3-butenyl acetate,
3-heptenyl acetate,
3-pentenyl acetate,
3-tetradecenyl heptanoate,
3-cyclopentyl-3-butenyl 3-methylhexanoate,
4-cyclodecyl-3-butenyl 2-propylbutanoate,
9-cyclopentyl-3-nonenyl 3,3-dimethylpentanoate,
5-cyclononyl-3-pentenyl hexanoate,
5-cyclopentyl-3-pentenyl pentanoate,
4-(2-methylcyclopentyl)-3-butenyl octanoate,
4-(4-methylcyclononyl)-3-butenyl propanoate,
4-(2-pentylcyclopentyl)-3-butenyl heptanoate, and the like, and mixtures thereof.

Specific examples of 3-haloalkyl alkanoates that are produced by the process of this invention are 3-chlorobutyl acetate,
3-bromoheptyl acetate,
3-fluoropentyl acetate,
3-iododecyl heptanoate,
3-chloro-4-cyclopentylbutyl 3-methylhexanoate,
4-cyclodecyl-3-iodobutyl 2-propylbutylnonate,
9-cyclopentyl-3-fluorononyl 3,3-dimethylpentanoate,
3-bromo-5-cyclopentyl hexanoate,
3-bromo-5-cyclopentyl pentanoate,
3-chloro-4-(2-methylcyclopentyl)butyl octanoate,
3-bromo-4-(4-methylcyclononyl)butyl propanoate,
3-bromo-4-(2-pentylcyclopentyl)heptanoate, and the like, and mixtures thereof.

Generally, the reaction temperature is in the range of −80 to −30° C., preferably −70 to −40° C. Pressures in the range of 0.5 to 10 atmospheres are usually employed. Atmospheric pressure is often employed because of convenience. Reaction times sufficient to carry out the desired degree of conversion are employed. Generally, the reaction time is in the range of 10 minutes to 48 hours.

In general, the mole ratio of paraformaldehyde to olefin is in the range of 0.5:1 to 10:1. The mole ratio of alkanoic anhydride to olefin is in the range of 0.25:1 to 5:1. About 0.1 to 10 moles of hydrogen halide are employed for each mole of olefin.

A suitable diluent, if desired, can comprise as much as 95 weight percent of the resulting reaction mixture. Any diluent can be employed which is substantially completely nonreactive under the reaction conditions. Examples of suitable diluents include methylene chloride, chloroform, fluoroform, fluorotrichloromethane, carbon tetrachloride, tetrahydropyran, tetrahydrofuran, hexane, cyclohexane, diethyl ether, and the like, and mixtures thereof.

The alkenyl alkanoates which are synthesized according to the process of this invention are known compositions. Such compositions can be readily hydrogenated to the straight-chain alkanoates which are useful as solvents, saponified to the unsaturated alcohol, or pyrolyzed to the diolefin. Further, these alkanoates can be copolymerized with a thiocarbonyl fluoride and then processed into a film that is both elastic and colorless, according to the process described on page 2635 of Journal of Polymer Science, vol. 4, pages 2617–2636 (1966).

The advantages of this invention are further illustrated by the following examples. The reactants and proportions and other specific conditions are presented as being typical and should not be construed to limit the invention unduly.

EXAMPLE I

A stirred reactor was charged with 63 g. of 97 weight percent paraformaldehyde, 168 g. of 1-hexene, and 500 ml. of methylene chloride. Upon cooling to −65° C., 255 g. of acetic anhydride was added and hydrogen chloride was passed through the mixture for four hours while maintaining the temperature at −65° C. Then, 500 ml. of water was added to the resulting reaction mixture. The methylene chloride was later separated from the water layer, washed with water, washed with saturated sodium carbonate solution until neutral, dried over magnesium sulfate and filtered. Volatiles were stripped at atmospheric pressure and the residue was fractionated. A yield of 63.8 g. of 3-chloroheptyl acetate and a 30 mole percent yield of 3-heptenyl acetate based on the 1-hexene or paraformaldehyde charge was recovered, as identified by gas-liquid chromatography.

This example demonstrates the synthesis of alkenyl alkanoates and 3-haloalkyl alkanoates according to the process of this invention.

EXAMPLE II

The run of Example I was substantially repeated except that a temperature of 0 to 10° C. rather than −65° C. was employed. Gas-liquid chromatography of the product determined that a small quantity of 3-chloroheptyl acetate was formed, but that little, if any, 3-heptenyl acetate was produced.

Example II demonstrates that low temperatures are essential for the process of this invention and that relatively high temperatures are unsuitable.

Although this invention has been described in considerable detail, it must be understood that such detail is for the purpose of illustration only and that many variations and modification can be made by one skilled in the art without departing from the scope and spirit thereof.

I claim:
1. A process for the production of an alkenyl alkanoate and a 3-haloalkyl alkanoate comprising reacting a 1-alkene represented by the formula R—CH$_2$—CH=$_2$, paraformaldehyde, a hydrogen halide and an alkanoic anhydride represented by the formula

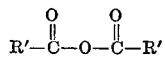

at a temperature in the range of −80 to −30° C., wherein R is hydrogen or alkyl, cycloalkyl or combinations thereof having 1 to 10 carbon atoms per R group and R' is alkyl having 1 to 6 carbon atoms per R' group.

2. A process according to claim 1 where said reacting is carried out at a temperature in the range of −70 to −40° C., at a pressure in the range of 0.5 to 10 atmospheres and at a time in the range of 10 minutes to 48 hours.

3. A process according to claim 1 wherein the mole ratio of paraformaldehyde to 1-alkene is in the range of 0.5:1 to 10:1, the mole ratio of alkanoic anhydride to 1-alkene is in the range of 0.25:1 to 5:1 and the mole ratio of hydrogen halide to 1-alkene is in the range of 0.1:1 to 10:1.

4. A process according to claim 1 wherein said reacting is carried out in the presence of a substantially completely non-reactive diluent which can comprise up to 95 weight percent of the resulting reaction mixture.

5. A process according to claim 4 wherein said diluent is methylene chloride.

6. A process according to claim 1 wherein said 1-alkene is 1-hexene, said hydrogen halide is hydrogen chloride and said alkanoic anhydride is acetic anhydride.

7. A process according to claim 1 wherein said alkenyl alkanoate is represented by the formula

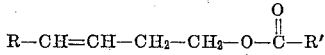

and said 3-haloalkyl alkanoate is represented by the formula

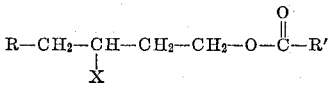

wherein R and R' are as defined in claim 1 and X is chlorine, bromide, fluorine or iodine.

8. A process according to claim 1 wherein said alkenyl alkanoate is 3-heptenyl acetate and said 3-chloroalkyl alkanoate is 3-chloroheptyl acetate.

References Cited
UNITED STATES PATENTS

| | | | |
|---|---|---|---|
| 2,246,285 | 6/1941 | Arundale et al. | 260—494 |
| 2,578,647 | 12/1951 | Stiteler | 260—494 |
| 2,666,795 | 1/1954 | Steadman | 260—494 |

LORRAINE A. WEINBERGER, Primary Examiner
V. GARNER, Assistant Examiner

U.S. Cl. X.R.
260—408, 410

UNITED STATES PATENT OFFICE

CERTIFICATE OF CORRECTION

Patent No. 3,644,496　　　　Paul R. Stapp　　　Dated: February 22, 1972

It is certified that error appears in the above-identified patent and that sa Letters Patent are hereby corrected as shown below:

Column 3, line 38, the formula "$R-CH_2-CH=_2$" should read "$R-CH_2-CH=CH_2$".

Signed and sealed this 11th day of July 1972.

(SEAL)
Attest:

EDWARD M. FLETCHER, JR.　　　　　　　ROBERT GOTTSCHALK
Attesting Officer　　　　　　　　　　Commissioner of Patents